US010909720B2

United States Patent
Inazumi et al.

(10) Patent No.: US 10,909,720 B2
(45) Date of Patent: Feb. 2, 2021

(54) CONTROL DEVICE FOR ROBOT, ROBOT, ROBOT SYSTEM, AND METHOD OF CONFIRMING ABNORMALITY OF ROBOT

(71) Applicant: Seiko Epson Corporation, Tokyo (JP)

(72) Inventors: Mitsuhiro Inazumi, Shiojiri (JP); Takahiko Noda, Azumino (JP)

(73) Assignee: Seiko Epson Corporation

( * ) Notice: Subject to any disclaimer, the term of this patent is extended or adjusted under 35 U.S.C. 154(b) by 203 days.

(21) Appl. No.: 16/047,518

(22) Filed: Jul. 27, 2018

(65) Prior Publication Data

US 2019/0035108 A1 Jan. 31, 2019

(30) Foreign Application Priority Data

Jul. 28, 2017 (JP) .................. 2017-146117

(51) Int. Cl.
| | | |
|---|---|---|
| G06T 7/73 | (2017.01) | |
| B25J 9/16 | (2006.01) | |
| G06T 1/00 | (2006.01) | |
| G06T 7/00 | (2017.01) | |

(52) U.S. Cl.
CPC .............. G06T 7/74 (2017.01); B25J 9/1612 (2013.01); B25J 9/1692 (2013.01); B25J 9/1697 (2013.01); G06T 1/0014 (2013.01); G06T 7/0004 (2013.01); G06T 7/73 (2017.01); G06T 2207/10004 (2013.01); G06T 2207/30108 (2013.01); G06T 2207/30204 (2013.01)

(58) Field of Classification Search
None
See application file for complete search history.

(56) References Cited

U.S. PATENT DOCUMENTS

| | | | | |
|---|---|---|---|---|
| 5,617,335 A | * | 4/1997 | Hashima | B25J 9/1697 340/815.57 |
| 8,526,668 B2 | | 9/2013 | Inazumi | |
| 8,971,569 B2 | | 3/2015 | Inazumi | |
| 2006/0007452 A1 | * | 1/2006 | Gaspard | G01C 11/00 356/620 |
| 2011/0157373 A1 | * | 6/2011 | Ye | G06T 7/85 348/187 |
| 2013/0345718 A1 | * | 12/2013 | Crawford | A61B 10/02 606/130 |

(Continued)

FOREIGN PATENT DOCUMENTS

| | | |
|---|---|---|
| JP | 2011-216067 A | 10/2011 |
| JP | 2016-001181 A | 1/2016 |

OTHER PUBLICATIONS

De Andrade, Douglas Coimbra, Luís Gonzaga Trabasso, Carlos César Aparecido Eguti, and Ricardo Suterio. "A robust methodology for outdoor optical mark recognition." Journal of the Brazilian Society of Mechanical Sciences and Engineering 39, No. 8 (May 2017): 3103-3120. (Year: 2017).*

(Continued)

Primary Examiner — Kim Y Vu
Assistant Examiner — Nathan J Bloom
(74) Attorney, Agent, or Firm — Harness, Dickey & Pierce, P.L.C.

(57) ABSTRACT

A control device determines whether deviation between a predetermined position detected by a processor and a reference predetermined position stored in advance in a control device is within a preset allowable range.

3 Claims, 5 Drawing Sheets

(56) References Cited

U.S. PATENT DOCUMENTS

| | | | |
|---|---|---|---|
| 2016/0242849 A9* | 8/2016 | Crawford | A61B 34/74 |
| 2017/0032529 A1* | 2/2017 | De Villiers | G01B 11/002 |
| 2018/0024521 A1* | 1/2018 | Matsuura | B25J 9/0096 |
| | | | 700/83 |

OTHER PUBLICATIONS

Jian B-L, Tsai C-S, Kuo Y-C, Guo Y-S. An image vision and automatic calibration system for universal robots. Journal of Low Frequency Noise, Vibration and Active Control. Sep. 2019 (Year: 2019).*

L. O'Gorman, A. M. Bruckstein, C. B. Bose and I. Amir, "Subpixel registration using a concentric ring fiducial," [1990] Proceedings. 10th International Conference on Pattern Recognition, Atlantic City, NJ, USA, 1990, pp. 249-253 vol. 2, doi: 10.1109/ICPR.1990 Year: 1990).*

Guang Jiang and Long Quan, "Detection of concentric circles for camera calibration," Tenth IEEE International Conference on Computer Vision (ICCV'05) vol. 1, Beijing, 2005, pp. 333-340 vol. 1, doi: 10.1109/ICCV.2005.73. (Year: 2005).*

\* cited by examiner

CONTROL DEVICE FOR ROBOT, ROBOT, ROBOT SYSTEM, AND METHOD OF CONFIRMING ABNORMALITY OF ROBOT

BACKGROUND

1. Technical Field

The present invention relates to confirmation of abnormality of a camera and an arm in a robot.

2. Related Art

When a robot including an arm and a camera grips an object, the object detected by the camera is gripped by the arm. Such operation is accurately executed when the camera and the arm are appropriately calibrated.

JP-A-2016-1181 (Patent Literature 1) describes a method of configuring, using at least three cameras, a plurality of sets formed by a plurality of cameras and detecting abnormality on the camera side on the basis of consistency of information concerning three-dimensional positions of characteristics in images acquired by the sets. However, when the technique described in Patent Literature 1 is used in a robot, three or more cameras are necessary and abnormality on an arm side cannot be detected. Therefore, there is a demand for a technique applicable to a small number of cameras and capable of detecting both of abnormality on the camera side and abnormality on the arm side.

SUMMARY

An advantage of some aspects of the invention is to solve at least a part of the problems, and the invention can be implemented as the following forms.

(1) According to a first aspect of the invention, a control device that controls an arm of a robot and a camera set independently from the arm is provided. The control device includes: an arm control section configured to control the arm; a camera control section configured to control the camera; a position detecting section configured to detect, from an image of the arm photographed by the camera in a state in which the arm is controlled by the arm control section to take a specific position and posture, a predetermined position in a camera coordinate system of a specific shape provided in the arm; and a position determining section configured to determine whether deviation between the predetermined position detected by the position detecting section and a reference predetermined position stored in advance in the control device is within a preset allowable range. According to the control device, the predetermined position compared with the reference predetermined position is a predetermined position of a specific shape detected from the image of the arm photographed by the camera in the state in which the arm is controlled by the arm control section to take the specific position and posture. Therefore, when the position determining section determines that the deviation between the predetermined position and the reference predetermined position is outside the allowable range, the deviation is deviation caused by at least one of abnormality on the camera side and abnormality on the arm side. Accordingly, with the control device, it is possible to detect both of the abnormality on the camera side and the abnormality on the arm side. The control device is applicable to a robot including one or more cameras.

(2) In the control device, the specific shape detected by the position detecting section may be a mark attached to the arm, the mark may be formed by a plurality of components, centroids of which overlap, and the position detecting section may detect the overlap of the centroids to thereby detect the mark from the image and detect a centroid of the mark in the image as the predetermined position. With the control device, it is possible to detect the mark by detecting the overlap of the centroids. According to the control device, it is possible to prevent detection accuracy of the specific shape from being deteriorated by rotation or tilt of the mark in the image or enlargement or reduction of the mark in the image. Therefore, it is possible to improve the detection accuracy of the specific shape.

(3) According to a second aspect of the invention, a robot connected to the control device described above is provided. According to the robot, it is possible to detect both of abnormality on the camera side and abnormality on the arm side.

(4) According to a third aspect of the invention, a robot system including: a robot; and the control device described above connected to the robot is provided. According to the robot system, it is possible to detect both of abnormality on the camera side and abnormality on the arm side.

(5) According to a fourth aspect of the invention, a robot including: an arm; a camera set independently from the arm; and a control section is provided. In the robot, the control section includes: an arm control section configured to control the arm; a camera control section configured to control the camera; a position detecting section configured to detect, from an image of the arm photographed by the camera in a state in which the arm is controlled by the arm control section to take a specific position and posture, a predetermined position in a camera coordinate system of a specific shape provided in the arm; and a position determining section configured to determine whether deviation between the predetermined position detected by the position detecting section and a reference predetermined position stored in advance in the control section is within a preset allowable range. According to the robot, it is possible to detect both of abnormality on the camera side and abnormality on the arm side.

(6) According to a fifth aspect of the invention, a control device that controls an arm of a robot and a camera set independently from the arm is provided. The control device includes a processor and a memory. The processor detects, from an image of the arm photographed by the camera in a state in which the arm is controlled to take a specific position and posture, a predetermined position in a camera coordinate system of a specific shape provided in the arm and determines whether deviation between the predetermined position and a reference predetermined position stored in advance in the memory is within a preset allowable range. According to the control device, it is possible to detect both of abnormality on the camera side and abnormality on the arm side.

(7) According to a sixth aspect of the invention, a method of confirming, in a robot including an arm and a camera set independently from the arm, abnormality of at least one of the camera and the arm is provided. The method includes: acquiring an image of the arm photographed by the camera in a state in which the arm is controlled to take a specific position and posture; detecting, from the image, a predetermined position in a camera coordinate system of a specific shape provided in the arm; and determining whether deviation between the detected predetermined position and a reference predetermined position stored in advance is within a preset allowable range. According to the method, the predetermined position compared with the reference predetermined position is a predetermined position of a specific shape detected from the image of the arm photographed by the camera in the state in which the arm is controlled to take the specific position and posture. Therefore, when it is determined that the deviation between the predetermined position and the reference predetermined position is outside the allowable range, the deviation is deviation caused by at least one of abnormality on the camera side and abnormality on the arm side. Accordingly, with the method, it is possible to detect both of the abnormality on the camera side and the abnormality on the arm side.

The invention can be implemented in various forms other than the forms explained above. For example, the invention can be implemented in forms such as a computer program for implementing the function of the control device and a non-transitory storage medium having the computer program stored therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Configuration of a Robot System

Figure 1:
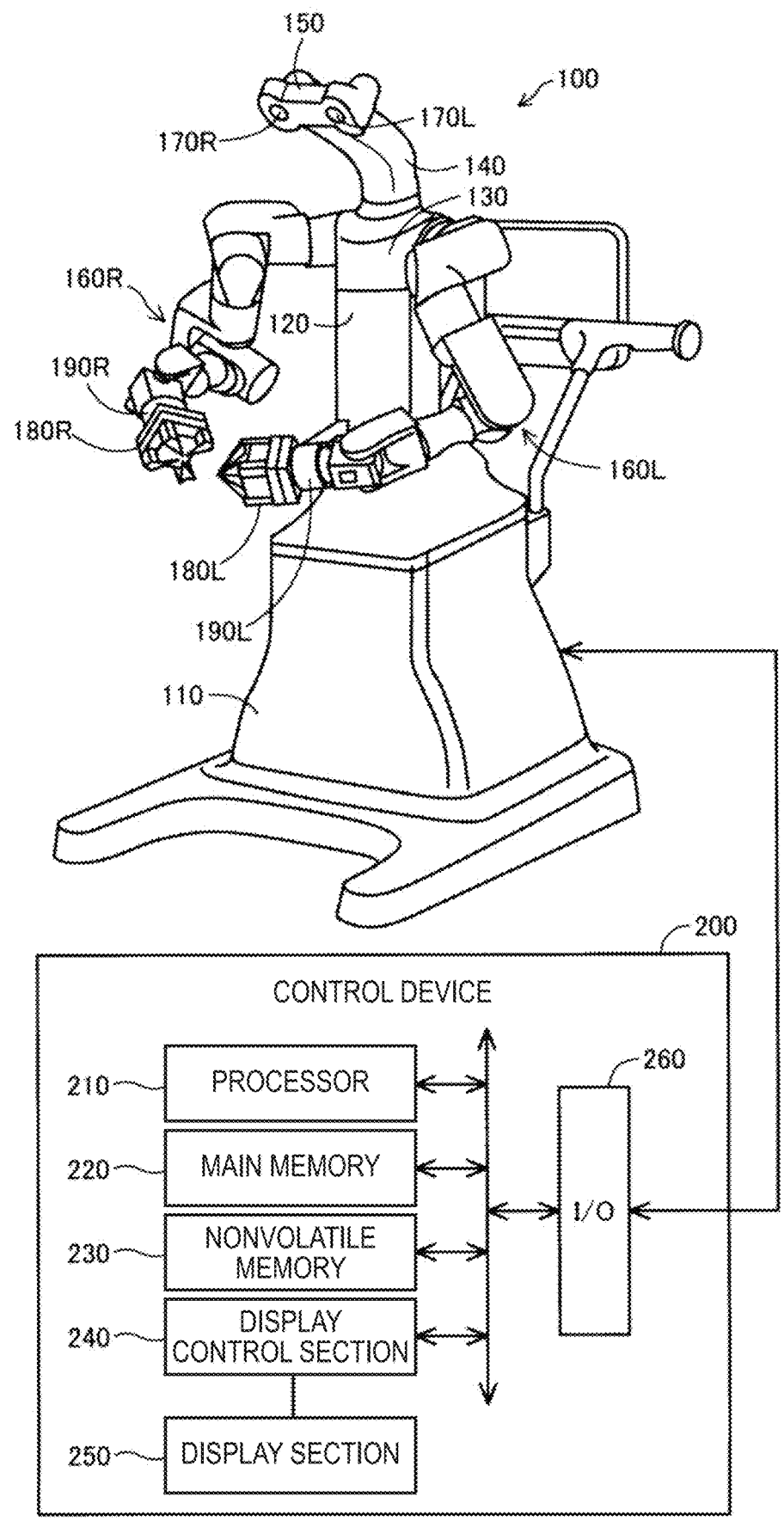
FIG. 1 is a conceptual diagram of a robot system in a first embodiment.

FIG. 1 is a conceptual diagram of a robot system in a first embodiment. The robot system includes a robot 100 and a control device 200. The robot 100 is an autonomous robot that can recognize a work target with cameras 170L and 170R, freely adjust power, and perform work while autonomously performing determination. The robot 100 is also capable of operating as a teaching playback robot that executes work according to teaching data created in advance.

The robot 100 includes a base 110, a body 120, a shoulder 130, a neck 140, a head 150, and two arms 160L and 160R. Hands 180L and 180R are detachably attached to the arms 160L and 160R. The hands 180L and 180R are end effectors that grip work and tools. Cameras 170L and 170R are set in the head 150. The cameras 170L and 170R are provided independently from the arms 160L and 160R. The cameras 170L and 170R are fixed cameras, the position and posture of which does not change.

Force sensors 190L and 190R are provided in the wrists of the arms 160L and 160R. The force sensors 190L and 190R are sensors that detect reactions and moments against forces applied to work by the hands 180L and 180R. As the force sensors 190L and 190R, for example, a six-axis force sensor that can simultaneously detect six components, that is, force components in translational three-axis directions and moment components around rotation three axes can be used. Note that the force sensors 190L and 190R can be omitted.

Characters "L" and "R" added to the ends of the signs of the arms 160L and 160R, the cameras 170L and 170R, the hands 180L and 180R, and the force sensors 190L and 190R respectively mean "left" and "right". When it is unnecessary to distinguish these sections, signs without the characters "L" and "R" are used for explanation.

The control device 200 includes a processor 210, a main memory 220, a nonvolatile memory 230, a display control section 240, a display section 250, and an I/O interface 260. These sections are connected via a bus. The processor 210 is, for example, a microprocessor or a processor circuit. The control device 200 is connected to the robot 100 via the I/O interface 260. Note that the control device 200 may be housed on the inside of the robot 100.

As the configuration of the control device 200, various configurations other than the configuration shown in FIG. 1 can be adopted. For example, the processor 210 and the main memory 220 may be deleted from the control device 200 shown in FIG. 1 and may be provided in another device communicably connected to the control device 200. In this case, an entire combined device of the other device and the control device 200 functions as a control device for the robot 100. In another embodiment, the control device 200 may include two or more processors 210. In still another embodiment, the control device 200 may be implemented by a plurality of devices communicably connected to one another. In these various embodiments, the control device 200 may be configured as a device or a device group including one or more processors 210.

Figure 2:
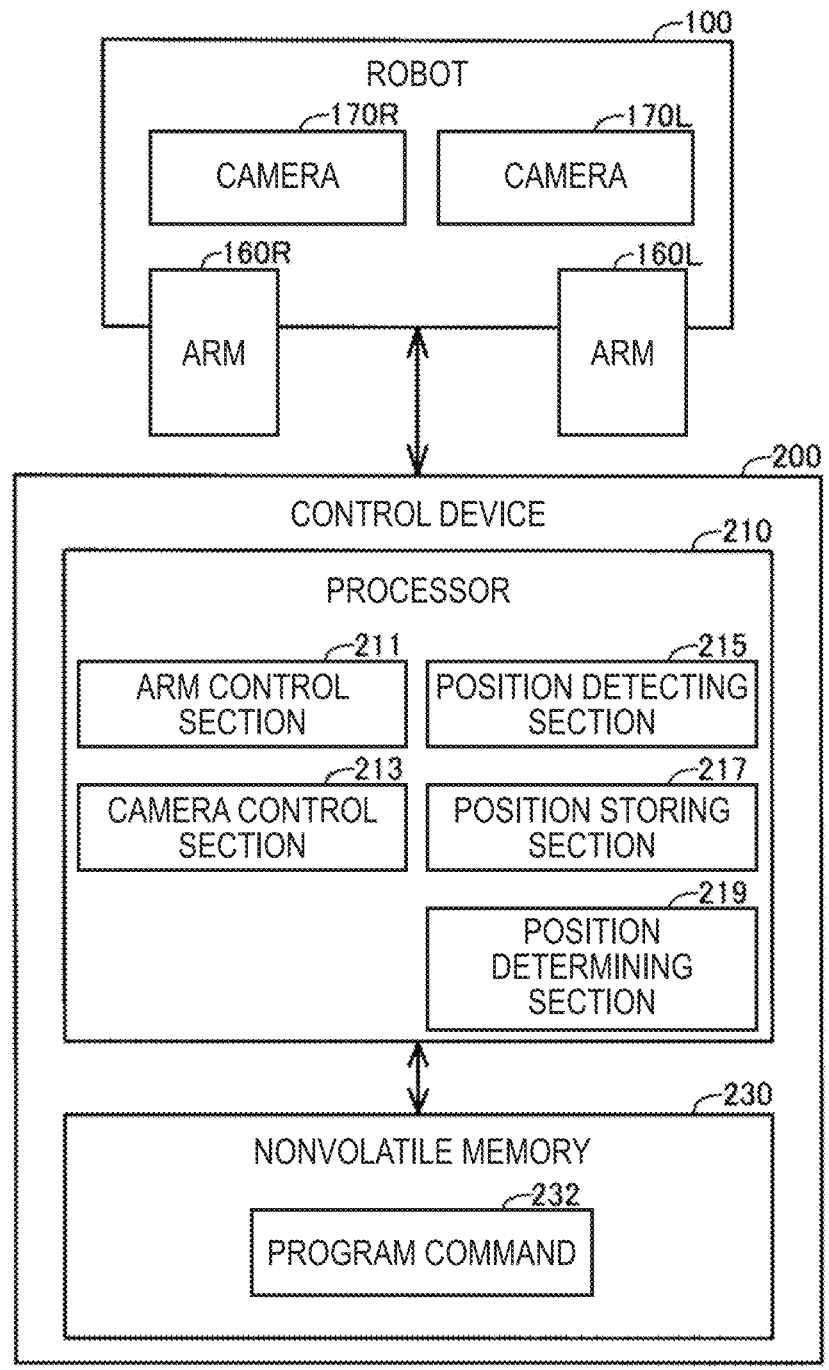
FIG. 2 is a block diagram showing functions of a robot and a control device.

FIG. 2 is a block diagram showing functions of the robot 100 and the control device 200. The processor 210 of the control device 200 executes various program commands 232 stored in advance in the nonvolatile memory 230 to thereby respectively implement functions of an arm control section 211, a camera control section 213, a position detecting section 215, a position storing section 217, and a position determining section 219. However, a part or all of the functions of the sections 211 to 219 may be implemented by a hardware circuit.

The arm control section 211 controls the arm 160. The arm control section 211 can control the arm 160 to take any position and posture. Note that the position and posture means a state specified by three coordinate values in a three-dimensional coordinate system and rotations around coordinate axes.

The camera control section 213 controls the camera 170. The camera control section 213 can control the camera 170 to perform imaging.

The position detecting section 215 detects, from an image of the arm 160 photographed by the camera 170 in a state in which the arm 160 is controlled by the arm control section 211 to take a specific position and posture, a predetermined position in a camera coordinate system of a specific shape provided in the arm 160. The predetermined position means the position of a portion of the specific shape. In this embodiment, the specific shape detected by the position detecting section 215 is a mark attached to the arm 160. The mark is explained below. In another embodiment, the specific shape detected by the position detecting section 215 may be the shape of a part of the arm 160 or may be the shape of the hand 180. In still another embodiment, the specific shape detected by the position detecting section 215 may be any shape as long as the position detecting section 215 can detect the shape.

The position storing section 217 stores, as a reference predetermined position, a predetermined position of a specific shape detected from a photographed image of the arm 160 caused to take a specific position and posture. In this embodiment, the image from which the predetermined position of the specific shape stored as the reference predetermined position is detected is a photographed image of the arm 160 that the arm control section 211 controls first to take the specific position and posture after calibration of the camera 170 and the arm 160 is carried out. The reference predetermined position stored in the position storing section 217 is used for position determination by the position determining section 219.

The position determining section 219 determines whether deviation between the predetermined position of the specific shape detected by the position detecting section 215 and the reference predetermined position stored in advance in the position storing section 217 is within a preset allowable range.

B. Reference Predetermined Position Storage Processing

Figure 3:
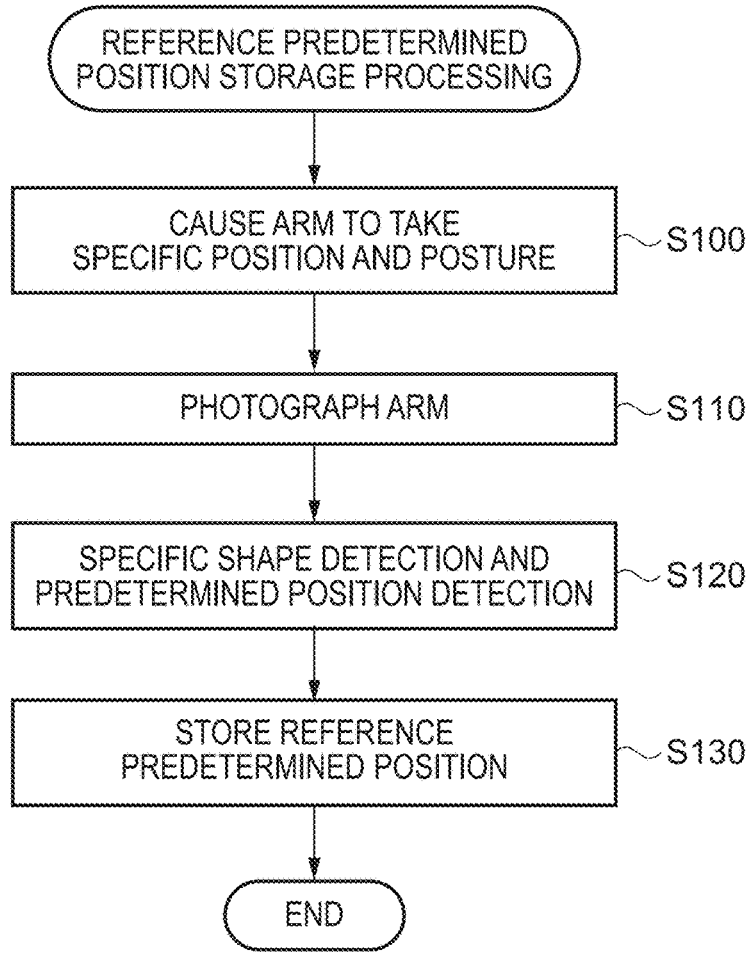
FIG. 3 is a flowchart for explaining reference predetermined position storage processing executed by a processor.

FIG. 3 is a flowchart for explaining reference predetermined position storage processing executed by the processor 210. The reference predetermined position storage processing is executed after calibration of the camera 170 and the arm 160 is carried out.

When the reference predetermined position storage processing is started, the processor 210 causes the arm 160 to take a specific position and posture (step S100). At this time, the specific position and posture taken by the arm 160 is a posture in which a portion attached with a mark in the arm 160 fits within an angle of view of the camera 170. After causing the arm 160 to take the specific position and posture, the processor 210 causes the camera 170 to photograph the arm 160 (step S110). At this time, the mark attached to the arm 160 is included in an image photographed by the camera 170. In this embodiment, the camera 170L photographs the arm 160L and the camera 170R photographs the arm 160R. In another embodiment, the camera 170L may photograph the arm 160R and the camera 170R may photograph the arm 160L. One of the camera 170L and the camera 170R may photograph the arm 160L and the arm 160R.

Figure 4:
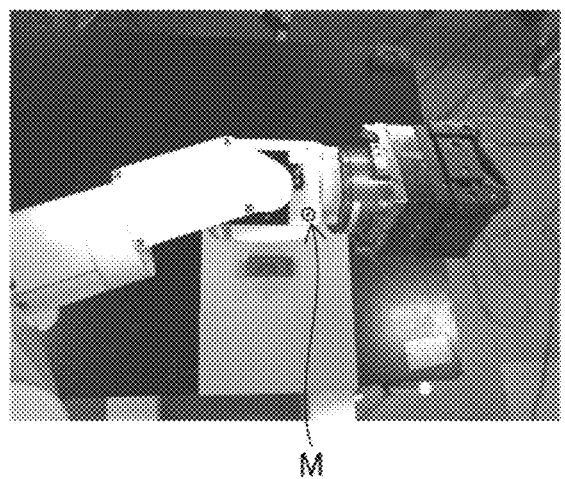
FIG. 4 is an explanatory diagram showing an example of an image photographed in step S110.

FIG. 4 is an explanatory diagram showing an example of the image photographed in step S110. The example shown in FIG. 4 is an image of the arm 160L photographed by the camera 170L. In FIG. 4, a circular mark M is attached to the arm 160L.

Figure 5:
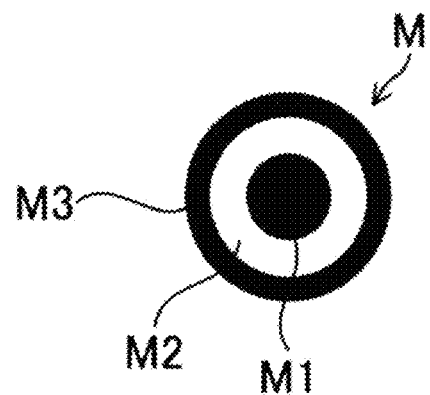
FIG. 5 is an enlarged view of a mark.

FIG. 5 is an enlarged view of the mark M. The mark M is formed by three components M1, M2, and M3, the centroids of which overlap. The centroid means the center of gravity in a plane figure. Because the components M1, M2, and M3 are concentric circles, the centroids of the components M1, M2, and M3 coincide in the center of a black circle, which is the component M1.

Figure 6:
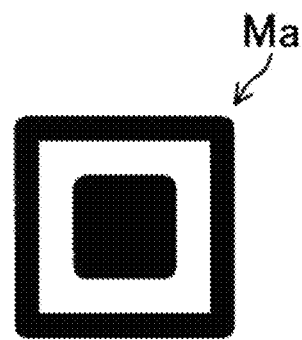
FIG. 6 is an explanatory diagram of a mark.
Figure 7:
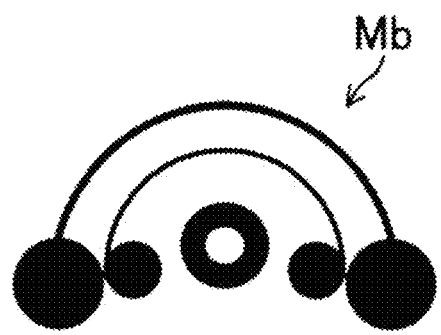
FIG. 7 is an explanatory diagram of a mark.

FIG. 6 is an explanatory diagram of a mark Ma. FIG. 7 is an explanatory diagram of a mark Mb. Like the mark M, the mark Ma and the mark Mb are formed by pluralities of components, the centroids of which overlap. In another embodiment, the mark Ma or the mark Mb may be attached as the mark attached to the arm 160. Another mark may be attached as long as the mark is formed by a plurality of components, the centroids of which overlap.

Referring back to FIG. 3, after causing the camera 170 to photograph the arm 160 (step S110), the processor 210 detects a specific shape provided in the arm 160 from an image photographed by the camera 170 and detects a predetermined position of a specific shape in the image (step S120). In this embodiment, the specific shape to be detected is the mark M.

An example of a method of detecting the mark M in step S120 is explained. First, the processor 210 binarizes the image photographed by the camera 170 using a preset threshold. Subsequently, the processor 210 performs, on the binarized image, labeling processing for extracting connected regions in the image. The processor 210 calculates centroids in the extracted regions and detects overlap of the centroids. When three centroids overlap, a figure formed by components having the centroids is detected as the mark M. At this point, the centroid of the mark M in the image is detected as a predetermined position. Note that, when calculating the centroids in the regions, the processor 210 may delete, using various characteristics such as the areas and the shapes of the regions, from the extracted regions, a region not regarded as a region where the mark M is detected.

After detecting the centroid of the mark M (step S120), the processor 210 stores, as a reference predetermined position, a position in the image of the centroid of the mark M, which is the predetermined position of the specific shape (step S130). Thereafter, the processor 210 ends the reference predetermined position storage processing.

C. Position Determination Processing

Figure 8:
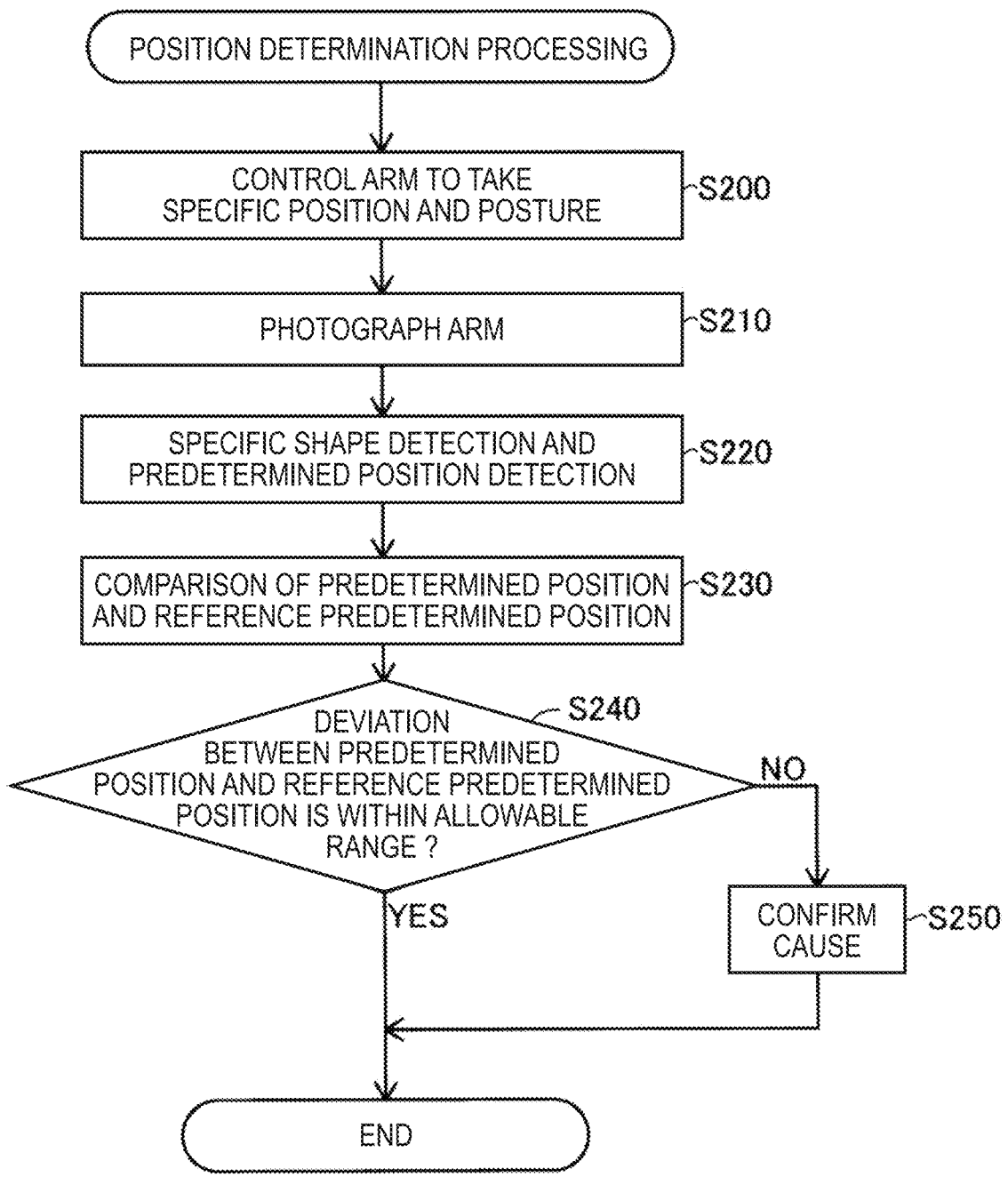
FIG. 8 is a flowchart for explaining position determination processing executed by the processor.

FIG. 8 is a flowchart for explaining position determination processing executed by the processor 210. The position determination processing is executed every time the robot 100 starts operation.

After starting the position determination processing, the processor 210 controls the arm 160 to take a specific position and posture (step S200). At this time, the specific position and posture to be taken by the arm 160 is the specific position and posture taken by the arm 160 in step S100 in the reference predetermined position storage processing. When abnormality occurs on the arm 160 side, even if the processor 210 controls the arm 160 to take the specific position and posture in step S200, the arm 160 takes a position and posture different from the specific position and posture.

After controlling the arm 160 to take the specific position and posture (step S200), the processor 210 causes the camera 170 to photograph the arm 160 (step S210). After causing the camera 170 to photograph the arm 160 (step S210), the processor 210 detects the mark M in the arm 160 from an image photographed by the camera 170 and detects, as a predetermined position, the position of the centroid of the mark M in the image (step S220). The detection of the mark M and the centroid in step S220 is performed in the same procedure as the detection of the mark M in step S120. When abnormality occurs on the camera 170 side, even if the arm 160 takes the specific position and posture in step S200, the position in the image of the centroid of the mark M detected in step S220 is a position different from the reference predetermined position.

After detecting the centroid of the mark M (step S220), the processor 210 compares the predetermined position detected in step S220 and the reference predetermined position stored in step S130 of the reference predetermined position storage processing (step S230).

After performing the comparison with the reference predetermined position (step S230), the processor 210 determines whether deviation between the predetermined position detected in step S220 and the reference predetermined position stored in step S130 of the reference predetermined position storage processing is within a preset range (step S240).

When determining that the deviation between the predetermined position and the reference predetermined position is not within the preset range (NO in step S240), an inspector of the robot 100 performs processing for confirming whether a cause of the deviation between the positions is abnormality on the camera 170 side or abnormality on the arm 160 side (step S250).

When determining that the deviation between the predetermined position and the reference predetermined position is within the preset range (YES in step S240) or after the processing for confirming the cause of the deviation between the positions (step S250), the processor 210 ends the position determination processing.

According to the first embodiment explained above, the predetermined position compared with the reference predetermined position is a predetermined position of a specific shape detected from an image of the arm 160 photographed by the camera 170 in a state in which the arm 160 is controlled by the arm control section 211 to take a specific position and posture. Therefore, when the position determining section 219 determines that deviation between the predetermined position and the reference predetermined position is outside the allowable range, the deviation is deviation caused by at least one of abnormality on the camera 170 side and abnormality on the arm 160 side. Accordingly, with the control device 200, it is possible to detect both of the abnormality on the camera 170 side and abnormality on the arm 160 side. The control device 200 is applicable to a robot including one or more cameras.

In the first embodiment, because the mark M formed by the plurality of components, the centroids of which overlap, is used as the specific shape, it is possible to detect the mark M, which is the specific shape, by detecting the overlap of the centroids. Consequently, it is possible to prevent detection accuracy of the specific shape from being deteriorated by rotation or tilt of the mark M in the image or enlargement or reduction of the mark M in the image. Therefore, it is possible to improve the detection accuracy of the specific shape.

D. Other Embodiments

In the control device 200 in the first embodiment explained above, the reference predetermined position storage processing is executed after the calibration of the camera 170 and the arm 160 is carried out. However, the invention is not limited to this. For example, the reference predetermined position storage processing may be performed at a stage of inspection before factory shipment of the robot 100 connected to the control device 200 in addition to being executed after the calibration of the camera 170 and the arm 160 is carried out. When it can be confirmed that states of the camera 170 and the arm 160 are the same as states during the calibration, the reference predetermined position storage processing may be performed at any timing.

In the control device 200 in the first embodiment explained above, the position determination processing is executed every time the robot 100 starts operation. However, the invention is not limited to this. For example, the position determination processing may be performed when the robot 100 connected to the control device 200 receives a shock. The position determination processing may be performed when the temperature in the arm 160 exceeds a preset temperature.

In the first embodiment explained above, the control device 200 controls the robot 100 including the camera 170. However, the invention is not limited to this. For example, the control device 200 may control a robot not including the camera 170 and the camera 170 set independently from the robot.

In the first embodiment explained above, the reference predetermined position is stored in the position storing section 217. However, the invention is not limited to this. For example, the reference predetermined position may be stored in the main memory 220, the nonvolatile memory 230, an external memory, or the like.

The invention is not limited to the embodiments, the examples, and the modifications explained above and can be realized in various configurations without departing from the spirit of the invention. For example, the technical features in the embodiments, the examples, and the modifications corresponding to the technical features in the forms described in the summary can be replaced or combined as appropriate in order to solve a part or all of the problems described above or achieve a part or all of the effects described above. Unless the technical features are explained as essential technical features in this specification, the technical features can be deleted as appropriate.

The entire disclosure of Japanese Patent Application No. 2017-146117, filed Jul. 28, 2017 is expressly incorporated by reference herein.

What is claimed is:

1. A control device that controls an arm of a robot and a camera set independently from the arm,
the control device comprising:
 a memory configured to store computer-executable instructions and a reference position of a specific object of the arm, the specific object being configured with a center component and two dots spaced apart from the center component, or a closed loop spaced apart from the center component, wherein the center component and two dots have the same centroid, and the center component and the closed loop have the same centroid; and
 a processor configured to execute the computer-executable instructions so as to:
  move the arm to a predetermined position at which the specific object of the arm is located at the reference position;
  capture an image of the arm including the specific object by the camera, after the arm moved to the predetermined position;
  binarize each pixel of the captured image;
  perform a labeling process of the binarized pixels to extract connected pixel regions;
  calculate a centroid of each of the connected pixel regions:
  identify a position at which three of the centroids of the connected pixel regions overlap each other as a calculated position of the specific object; and
  determine whether a deviation between the calculated position and reference position is within a predetermined range,
 wherein, when the processor determines that the deviation is out of the predetermined range, the processor is configured to calibrate the arm.

2. A robot system comprising:
a base;
an arm rotatably connected to the base;
a camera set independently from the arm;

a memory configured to store computer-executable instructions and a reference position of a specific object of the arm, the specific object being configured with a center component and two dots spaced apart from the center component, or a closed loop spaced apart from the center component, wherein the center component and two dots have the same centroid, and the center component and the closed loop have the same centroid; and a processor configured to execute the computer-executable instruction so as to:

move the arm to a predetermined position at which the specific object of the arm is located at the reference position;

capture an image of the arm including the specific object by the camera, after the arm moved to the predetermined position;

binarize each pixel of the captured image;

perform a labeling process of the binarized pixels to extract connected pixel regions;

calculate a centroid of each of the connected pixel regions;

identify a position at which three of the centroids of the connected pixel regions overlap each other as a calculated position of the specific object; and determine whether a deviation between the calculated position and reference position is within a predetermined range, wherein, when the processor determines that the deviation is out of the predetermined range, the processor is configured to calibrate the arm.

3. A method of confirming, in a robot including an arm and a camera set independently from the arm, abnormality of the arm, the method comprising:

moving the arm to a predetermined position at which a specific object of the arm is located at a reference position, the specific object being configured with a center component and two dots spaced apart from the center component, or a closed loop spaced apart from the center component, wherein the center component and two dots have the same centroid, and the center component and the closed loop have the same centroid;

capturing an image of the arm including the specific object by the camera, after the arm moved to the predetermined position;

binarizing each pixel of the captured image;

performing a labeling process of the binarized pixels to extract connected pixel regions;

calculating a centroid of each of the connected pixel regions;

identifying a position at which three of the centroids of the connected pixel regions overlap each other as a calculated position of the specific object; and determining whether a deviation between the calculated position and reference position is within a predetermined range, wherein, when the deviation is out of the predetermined range, calibration of the arm is performed.

* * * * *